United States Patent
Wolf

(10) Patent No.: US 11,485,647 B2
(45) Date of Patent: Nov. 1, 2022

(54) CHANGEABLE WATER FILTER IN COMBINATION WITH A MIXING VALVE FOR PRETREATMENT OF WATER IN A HOME APPLIANCE AND METHOD OF PRETREATING WATER

(71) Applicants: BSH Home Appliances Corporation, Irvine, CA (US); BSH Hausgeräte GmbH, Munich (DE)

(72) Inventor: Christian Wolf, New Bern, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 490 days.

(21) Appl. No.: 16/420,246

(22) Filed: May 23, 2019

(65) Prior Publication Data

US 2020/0369532 A1 Nov. 26, 2020

(51) Int. Cl.
*C02F 1/00* (2006.01)
*A47L 15/42* (2006.01)
(Continued)

(52) U.S. Cl.
CPC .......... *C02F 1/003* (2013.01); *A47L 15/4202* (2013.01); *A47L 15/4217* (2013.01);
(Continued)

(58) Field of Classification Search
None
See application file for complete search history.

(56) References Cited

U.S. PATENT DOCUMENTS 4,156,621 A * 5/1979 Andrews ............. A47L 15/4291
134/108
4,922,943 A * 5/1990 Gill ........................ E03B 1/048
137/563

(Continued)

FOREIGN PATENT DOCUMENTS

CN 108570830 A 9/2018
EP 1721558 A2 11/2006
(Continued)

OTHER PUBLICATIONS

International Search Report PCT/EP2020/063788 dated Jul. 24, 2020.

*Primary Examiner* — Robert J Popovics
(74) *Attorney, Agent, or Firm* — Michael E. Tschupp; Andre Pallapies; Brandon G. Braun

(57) ABSTRACT

A water pretreatment system connected to a water supply pipe for supplying water that has been preheated to a home appliance, including: a mixing valve having an inlet connected to the water supply pipe, and a pair of outlets; a water filter having an inlet communicated with one of the pair of outlets of the mixing valve, and having an outlet communicated with the home appliance; a bypass line having an inlet end connected to the other of the pair of outlets of the mixing valve, and having an outlet end connected to the home appliance, the mixing valve being configured to at least one of direct water to the water filter or direct water to the bypass line; and a controller configured to control the mixing valve such that preheated water supplied to the home appliance is one of unfiltered, mixed, or fully filtered by the water filter.

7 Claims, 4 Drawing Sheets

(51) Int. Cl.
  *B01D 35/02* (2006.01)
  *B01D 35/147* (2006.01)
  *D06F 39/04* (2006.01)
  *D06F 39/08* (2006.01)
  *D06F 39/10* (2006.01)
  *A47J 27/04* (2006.01)

(52) U.S. Cl.
  CPC .......... *A47L 15/4285* (2013.01); *B01D 35/02* (2013.01); *B01D 35/147* (2013.01); *D06F 39/04* (2013.01); *D06F 39/088* (2013.01); *D06F 39/10* (2013.01); *A47J 27/04* (2013.01); *A47J 2027/043* (2013.01); *C02F 2201/005* (2013.01); *C02F 2209/40* (2013.01); *C02F 2307/12* (2013.01)

(56) References Cited

U.S. PATENT DOCUMENTS

| | | | | |
|---|---|---|---|---|
| 5,208,923 | A * | 5/1993 | Stiver | E04H 4/1209 4/493 |
| 5,272,892 | A * | 12/1993 | Janutka | D06F 39/087 68/12.22 |
| 5,307,650 | A * | 5/1994 | Mertz | D06F 34/08 68/18 F |
| 5,439,019 | A * | 8/1995 | Quandt | D06F 34/06 68/12.22 |
| 5,501,792 | A * | 3/1996 | Carroll, Jr. | D06F 39/006 210/167.01 |
| 5,573,677 | A * | 11/1996 | Dembrosky | E03B 1/04 210/764 |
| 5,645,721 | A * | 7/1997 | Carroll, Jr. | D06F 39/006 210/438 |
| 5,772,783 | A * | 6/1998 | Stacker | D06F 43/08 210/806 |
| 5,858,248 | A * | 1/1999 | Plester | C02F 9/005 210/741 |
| 5,947,135 | A | 9/1999 | Sumida et al. | |
| 6,195,825 | B1 * | 3/2001 | Jones | D06F 39/006 210/791 |
| 6,299,779 | B1 * | 10/2001 | Pattee | D06F 39/00 210/167.3 |
| 6,451,211 | B1 * | 9/2002 | Plester | B67D 1/0021 222/189.09 |
| 6,458,281 | B2 * | 10/2002 | Magnoff | A47L 15/4202 210/791 |
| 6,495,049 | B1 * | 12/2002 | Van Esch | C02F 9/005 210/120 |
| 7,255,115 | B2 * | 8/2007 | Kwon | B08B 3/102 134/186 |
| 7,464,418 | B2 | 12/2008 | Seggio et al. | |
| 7,882,715 | B2 * | 2/2011 | Yoo | D06F 39/10 210/167.01 |
| 7,971,601 | B2 * | 7/2011 | Lum | F16K 31/002 236/100 |
| 8,252,173 | B2 | 8/2012 | Scholz et al. | |
| 8,434,510 | B2 * | 5/2013 | Lum | G05D 23/02 236/100 |
| 8,505,741 | B2 | 8/2013 | Scholz et al. | |
| 9,138,125 | B2 * | 9/2015 | Heisele | D06F 39/006 |
| 9,170,584 | B2 * | 10/2015 | Lum | G05D 23/134 |
| 9,295,369 | B2 * | 3/2016 | Fauth | A47L 15/4221 |
| 10,046,982 | B2 * | 8/2018 | McIntosh | C02F 1/50 |
| 11,241,138 | B2 * | 2/2022 | Dries | A47L 15/4208 |
| 11,325,843 | B2 * | 5/2022 | Meier | C02F 1/003 |
| 2003/0079763 | A1 * | 5/2003 | Nam | B08B 3/12 134/186 |
| 2003/0140966 | A1 * | 7/2003 | Kempf | E03B 7/045 137/337 |
| 2003/0196277 | A1 * | 10/2003 | Hallman | D06F 43/086 8/142 |
| 2003/0196282 | A1 * | 10/2003 | Fyvie | D06F 43/086 15/3 |
| 2004/0000330 | A1 * | 1/2004 | Kwon | H01L 21/67057 134/186 |
| 2004/0045096 | A1 * | 3/2004 | Mani | D06F 43/08 8/142 |
| 2004/0117920 | A1 * | 6/2004 | Fyvie | D06F 43/086 8/158 |
| 2006/0059632 | A1 * | 3/2006 | Fyvie | D06F 43/086 8/158 |
| 2007/0131783 | A1 * | 6/2007 | Kempf | G05D 23/1346 236/12.1 |
| 2007/0137709 | A1 * | 6/2007 | Kempf | E03B 1/048 137/337 |
| 2007/0157397 | A1 * | 7/2007 | Fyvie | D06F 43/08 8/158 |
| 2009/0007972 | A1 * | 1/2009 | Lum | F16K 31/002 137/485 |
| 2009/0178981 | A1 * | 7/2009 | Centanni | A61L 2/183 210/188 |
| 2009/0230200 | A1 * | 9/2009 | Kempf | E03B 7/09 137/337 |
| 2010/0044284 | A1 * | 2/2010 | Scholz | C02F 9/005 210/85 |
| 2011/0024080 | A1 * | 2/2011 | Bose | F28F 9/02 165/71 |
| 2011/0114140 | A1 * | 5/2011 | Heisele | A47L 15/4221 68/12.01 |
| 2011/0132407 | A1 * | 6/2011 | Fauth | A47L 15/0002 134/25.2 |
| 2011/0259445 | A1 * | 10/2011 | Lum | F16K 31/002 137/468 |
| 2012/0104107 | A1 * | 5/2012 | Goncze | G05D 23/1346 236/12.11 |
| 2013/0037114 | A1 * | 2/2013 | Sudhalkar | E03B 7/071 137/596.12 |
| 2013/0240053 | A1 * | 9/2013 | Lum | F16K 31/002 137/337 |
| 2013/0263892 | A1 | 10/2013 | Thiyagarajan et al. | |
| 2014/0034166 | A1 * | 2/2014 | Kempf | E03B 7/09 137/625.4 |
| 2015/0240408 | A1 * | 8/2015 | Favaro | D06F 39/10 68/17 R |
| 2015/0337481 | A1 * | 11/2015 | Bae | D06F 29/005 34/245 |
| 2015/0368846 | A1 * | 12/2015 | Del Pos | D06F 39/088 68/17 R |
| 2015/0368847 | A1 * | 12/2015 | Del Pos | D06F 34/28 68/17 R |
| 2015/0368848 | A1 * | 12/2015 | Del Pos | D06F 39/007 68/17 R |
| 2016/0010266 | A1 * | 1/2016 | Del Pos | D06F 34/28 68/13 A |
| 2016/0311702 | A1 * | 10/2016 | Hartig | B01D 61/22 |
| 2017/0074523 | A1 * | 3/2017 | Collini | F24D 17/0052 |
| 2019/0359499 | A1 * | 11/2019 | Meier | C02F 1/003 |
| 2020/0317536 | A1 * | 10/2020 | Moore | C02F 1/008 |
| 2020/0369532 | A1 * | 11/2020 | Wolf | C02F 1/003 |

FOREIGN PATENT DOCUMENTS

| | | | | |
|---|---|---|---|---|
| EP | 2278059 | A1 | 1/2011 | |
| EP | 2783620 | B1 | 2/2016 | |
| JP | H06154474 | A | 6/1994 | |
| JP | 2015116296 | A | 6/2015 | |
| WO | 0248445 | A1 | 6/2002 | |
| WO | 2012140956 | A1 | 10/2012 | |
| WO | WO-2015086773 | A1 * | 6/2015 | ........ B01D 61/142 |
| WO | WO-2020234227 | A1 * | 11/2020 | ........ A47L 15/4202 |

* cited by examiner

CHANGEABLE WATER FILTER IN COMBINATION WITH A MIXING VALVE FOR PRETREATMENT OF WATER IN A HOME APPLIANCE AND METHOD OF PRETREATING WATER

FIELD OF THE INVENTION

The present disclosure relates generally to the pretreatment of water for use in home appliances. More particularly, the present disclosure relates to a water pretreatment system for supplying water to a home appliance and to a changeable water filter in combination with a controlled mixing valve for the pretreatment of water in a home appliance.

BACKGROUND OF THE INVENTION

Depending on the particular geographical location, as well as whether water is from a municipal water supply or from a private well, the water quality can vary greatly for things like the hardness, softness, mineral content such as iron, chlorine content, microorganisms, and other impurities. The water quality can have an adverse effect on the performance of a home appliance. For example, water from a water dispenser or ice from an ice maker in a refrigerator appliance can have a bad taste and/or odor or can have an unpleasant color if the water is not properly pretreated. Similarly, untreated water supplied to a dishwasher appliance can adversely affect the overall performance of the dishwasher appliance and can result in mineral build up and staining.

Water filters with interchangeable filter cartridges are known for use with home appliances such as refrigerators, ice makers, dishwashers, coffee makers, steam cookers, and the like.

SUMMARY OF THE INVENTION

However, the conventional water filters are not equipped to deal with the wide range in water quality that is encountered by consumers when connecting home appliances to the household water supply.

Also, for home appliances that use hot water, such as dishwashers, washing machines, and steam ovens, the hot water drastically reduces the lifetime of the water filter to the extent that it has not been practical to filter the hot water from the household water supply.

An apparatus consistent with the present disclosure is directed to providing a system for the pretreatment of water for use in home appliances such as, but not limited to, dishwashers, washing machines, and steam ovens that use hot water.

An apparatus consistent with the present disclosure is directed to providing a changeable water filter in combination with a mixing valve for the pretreatment of water in a home appliance.

An apparatus consistent with the present disclosure is directed to providing a changeable water filter in combination with a mixing valve for the pretreatment of supplied water for a dishwasher appliance to increase the performance of washing programs, such as cleaning, drying, and hygiene.

An apparatus consistent with the present disclosure is directed to providing a changeable water filter in combination with a controlled mixing valve that is designed into the water supply of the dishwasher appliance. Based on the status of a system program, the water supplied to the dishwashing compartment of the dishwasher appliance can be unfiltered, mixed as in partially filtered, or fully filtered. In this way, an apparatus consistent with the present disclosure is able to achieve improvements in cleaning, drying (e.g., reduce or eliminate spots on the items that have been washed in the dishwasher appliance), and hygiene.

According to one aspect, the present disclosure provides a water pretreatment system connected to a water supply pipe for supplying water that has been preheated to a home appliance, comprising: a mixing valve having an inlet connected to the water supply pipe, and a pair of outlets; a water filter having an inlet communicated with one of the pair of outlets of the mixing valve, and having an outlet communicated with the home appliance; a bypass line having an inlet end connected to the other of the pair of outlets of the mixing valve, and having an outlet end connected to the home appliance, the mixing valve being configured to at least one of direct water to the water filter or direct water to the bypass line; and a controller configured to control the mixing valve such that preheated water supplied to the home appliance is one of unfiltered, mixed, or fully filtered by the water filter.

According to another aspect, the home appliance comprises at least one of a dishwasher, a washing machine, or a steam oven.

According to another aspect, the controller comprises a microcontroller.

According to another aspect, the water filter comprises a changeable water filter which has replaceable filter cartridges.

According to another aspect, the preheated water is preheated to approximately 110° F. to 140° F.

According to another aspect, the home appliance comprises one of a dishwasher or a washing machine, and wherein during a first filling of a wash container of the dishwasher or washing machine, the wash container is filled with unfiltered heated water by controlling the mixing valve to direct the heated water to the bypass line so as to bypass the water filter, during a second filling the wash container is filled with both unfiltered water and filtered water for a mixture of both by controlling the mixing valve with the controller to first direct the heated water to the bypass line for a preset time and then after the preset time has elapsed, the controller controls the mixing valve to direct the heated water through the water filter for a remainder of the second filling, and during a last filling the wash container is filled with fully filtered heated water by controlling the mixing valve to direct the heated water to only the water filter.

According to another aspect, the home appliance comprises a dishwasher including a pre-wash cycle, a washing cycle, and a rinse cycle, and wherein during a first filling of a wash container of the dishwasher, the wash container is filled with unfiltered heated water in the pre-wash cycle by controlling the mixing valve to direct the heated water to the bypass line so as to bypass the water filter, during a second filling the wash container is filled with both unfiltered water and filtered water for a mixture of both in the washing cycle by controlling the mixing valve with the controller to first direct the hot water to the bypass line for a preset time and to the wash container and then after the preset time has elapsed, the controller controls the mixing valve to direct the heated water through the water filter for a remainder of the second filling, and during a last filling the wash container is filled with fully filtered heated water in the rinse cycle by controlling the mixing valve to direct the heated water to only the water filter.

According to another aspect, the preheated water is directed by the mixing valve to the water filter only during certain cycles of the home appliance, and the preheated water is directed by the mixing valve to the bypass line so as to bypass the filter at other times.

According to another aspect, the present disclosure provides a method of pretreating water that has been preheated and is supplied to a home appliance, the method comprising: filling the home appliance during a first filling with unfiltered heated water by controlling a mixing valve to direct the heated water to a bypass line so as to bypass a water filter; filling the home appliance during a second filling with both unfiltered water and filtered water for a mixture of both by controlling the mixing valve to first direct the heated water to the bypass line for a preset time and then after the preset time has elapsed, controlling the mixing valve to direct the heated water through the water filter for a remainder of the second filling; and filling the home appliance during a last filling with fully filtered heated water by controlling the mixing valve to direct the heated water to only the water filter.

According to another aspect, the home appliance comprises at least one of a dishwasher or a washing machine.

According to another aspect, the preheated water is preheated to approximately 110° F. to 140° F.

According to another aspect, the present disclosure provides a method of pretreating water that has been preheated and is supplied to a home appliance, the method comprising: supplying the home appliance with unfiltered heated water by controlling a mixing valve to direct the heated water to a bypass line so as to bypass a water filter; supplying the home appliance with both unfiltered water and filtered water for a mixture of both by controlling the mixing valve to direct the heated water to the bypass line and by controlling the mixing valve to direct the heated water through the water filter; and supplying the home appliance with fully filtered heated water by controlling the mixing valve to direct the heated water to only the water filter.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE EXEMPLARY EMBODIMENTS

Figure 1:
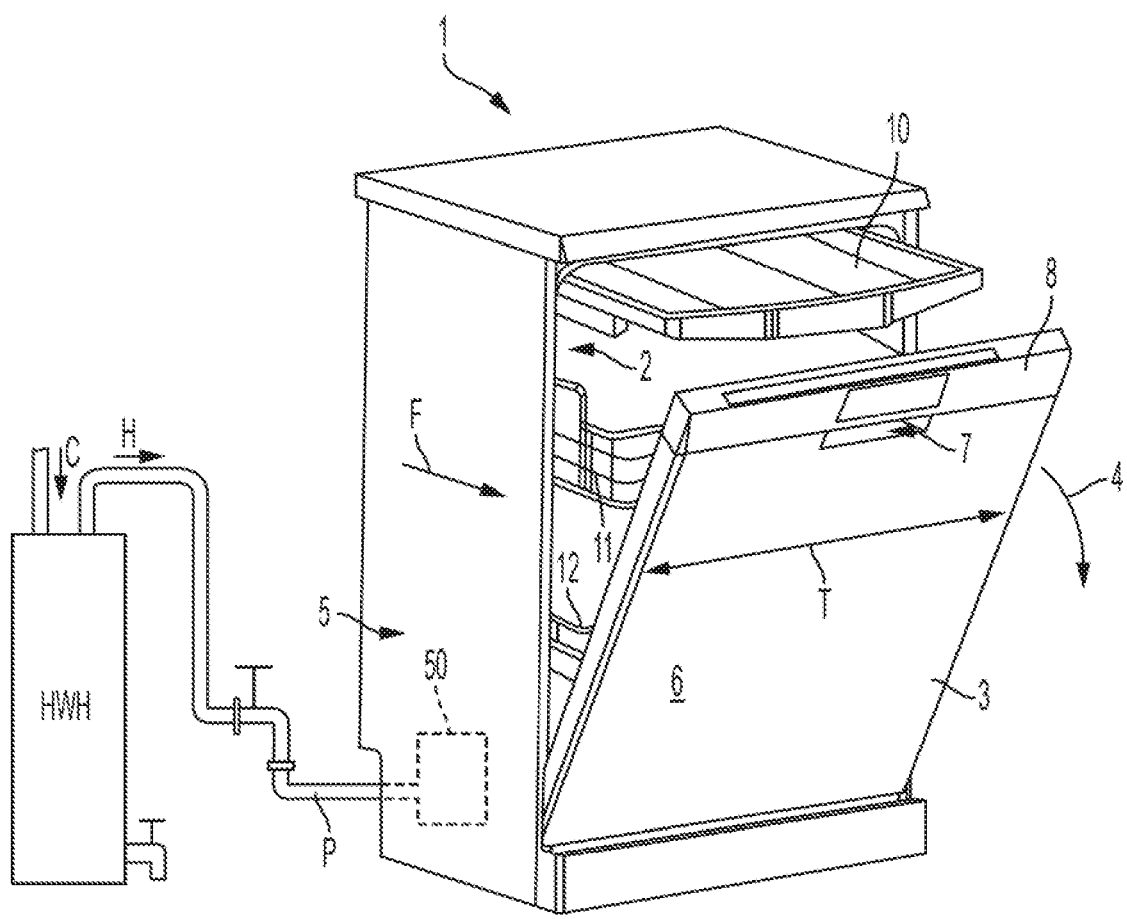
FIG. 1 shows a perspective view of a schematically illustrated dishwasher obliquely from the front with the door partially open according to an exemplary embodiment consistent with present disclosure.

The exemplary embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Moreover, it should be understood that terms such as top, bottom, front, rear, middle, upper, lower, right side, left side, vertical, horizontal, downward, upward, and the like used herein are for orientation purposes with respect to the drawings when describing the exemplary embodiments and should not limit the present invention unless explicitly indicated otherwise in the claims. Also, terms such as substantially, approximately, and about are intended to allow for variances to account for manufacturing tolerances, measurement tolerances, or variations from ideal values that would be accepted by those skilled in the art.

Elements of identical function and mode of operation are shown with identical reference characters in the figures. Only those parts of a domestic appliance that are necessary for an understanding of the invention are shown with reference characters and described.

A dishwasher 1 illustrated schematically in FIG. 1 is a domestic dishwasher and has as part of a carcass 5 a wash container 2 for holding items to be washed and processed, such as dishes, pots, flatware, glasses, cooking utensils and the like. The items to be washed here can be held for example in racks 11, 12 and/or a flatware drawer 10 and can be subjected to the action of wash liquor. The wash container 2 can have an at least substantially rectangular footprint with a front face F facing a user in the operating position. The front face F here can form part of a kitchen front made up of adjacent kitchen furniture or can also not be related to further furniture in the case of a freestanding appliance.

The loading opening of the wash container 2 can be closed by a door. In the exemplary embodiment, a front loading opening of the wash container 2 can be closed by a door 3 on the front face F of the dishwasher 1. The door 3 is shown partially open and at an angle to the vertical in FIG. 1. In contrast, in its closed position the door 3 is upright and roughly vertical. According to the drawing, the door 3 can be pivoted forward and down in the direction of the arrow 4 about a horizontal axis at the bottom of the front loading opening of the wash container 2, so that in the fully opened position it is at least approximately horizontal. The walls of the wash container 2 and the closed door 3 enclose a treatment or wash chamber, in which the items to be washed and/or dried can be accommodated.

The door 3 can be provided with a decorative panel 6 on its external front face F which faces the user and is vertical in the closed position, thereby improving its visual and/or haptic properties and/or matching it to surrounding kitchen furniture.

The dishwasher 1 here is configured as a freestanding or partially integrated or even fully integrated appliance.

An operating panel 8 that extends in the transverse direction T is assigned to the movable door 3 in its upper region in the exemplary embodiment according to the drawing in FIG. 1. The operating panel 8 may comprise a grip opening 7 that is accessible from the front to open and/or close the door 3 manually.

As shown in FIG. 1, the dishwasher 1 is connected, typically at a rear portion thereof, to a household water supply pipe P of heated water provided by a source of hot water such as a hot water heater HWH. The hot water heater HWH has a cold water inlet C connected to a water source such as a municipal water supply or well water supply, and a hot water outlet H that supplies hot water at a temperature of typically, but not limited to, between approximately 110° F. to 140° F. to the water supply pipe P. As will be described in detail later, the water supply pipe P is connected to a water pretreatment system 50 (see FIG. 1) of the dishwasher 1.

Figure 2:
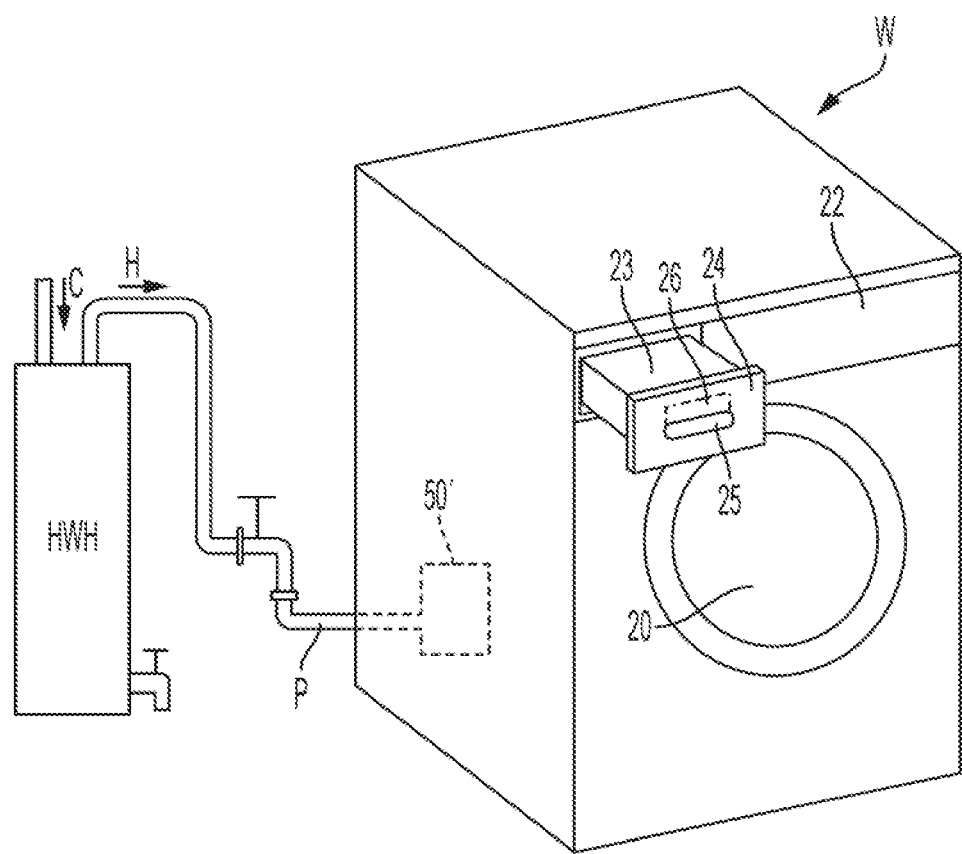
FIG. 2 shows a perspective view of a schematically illustrated washing machine according to an exemplary embodiment consistent with present disclosure.

On the other hand, FIG. 2 shows a laundry or washing machine W having, above a front filling opening 20 for access to a washing container, an operating panel 22, alongside which the recess for a detergent drawer 23, only indicated schematically here, is disposed. At the front, the detergent drawer 23 has a screening plate 24, which is usually adapted, in terms of shape and design, to the operating panel 22 and is often also referred to as a grip plate. Provided at an easy-to-grip location of the grip plate 24 is a grip hollow 25, which is set back some way behind the front so that an operator can place his/her fingers therein. Positioned in front of the top region of the grip hollow 25 is a covering plate 26, to allow, finally, the operator's fingers to grip behind the plate 26 in order to pull out the detergent drawer 23 by the grip plate 24 and/or the covering plate 26.

As with the dishwasher 1 above, the water supply pipe P is connected to a water pretreatment system 50' of the washing machine W (see FIG. 2). The water pipe P is connected to a source of hot water such as a hot water heater HWH, as described above. The water pretreatment system 50' will be described in detail below.

Figure 3:
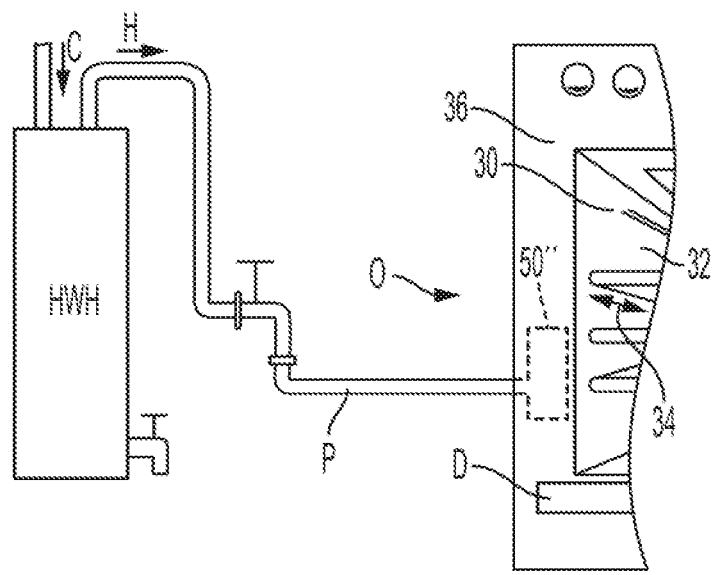
FIG. 3 shows a fragmentary perspective view of a schematically illustrated steam oven according to an exemplary embodiment consistent with present disclosure.

Still further, FIG. 3 shows a portion of a steam oven appliance O having a muffle unit 30 which forms a useful space 32 that extends in a depth direction 34 of the steam cooking appliance O. A door D closes the useful space 32 and rests against a muffle flange 36.

As with the dishwasher 1 and washing machine W above, the water supply pipe P is connected to a water pretreatment system 50" of the steam cooking appliance O (see FIG. 3). The water pipe P is connected to a source of hot water such as a hot water heater HWH, as described above. The water pretreatment system 50" will be described in detail below.

Figure 4:
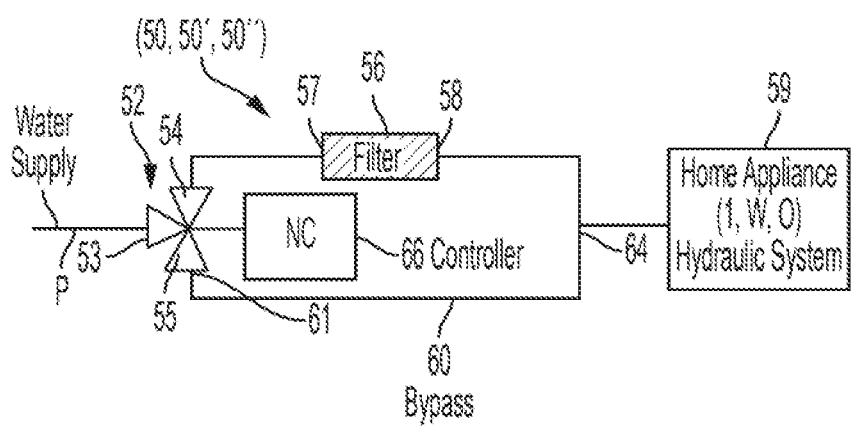
FIG. 4 shows a fluid circuit diagram of a water pretreatment system for supplying hot water to a home appliance according to an exemplary embodiment consistent with present disclosure.

With reference to FIG. 4, the water pretreatment system (50, 50', 50") for use with the above described home appliances, such as the dishwasher 1, the washing machine W, and the steam cooking appliance O, will now be described. In particular, the water pretreatment system (50, 50', 50") includes a mixing valve 52 having, for example, an inlet 53 connected to the water supply pipe P, and a pair of outlets 54 and 55. The mixing valve 52 can be any kind of valve such as, but not limited to, a solenoid valve, a motor valve, a piezo valve, or the like, with one or more inlets and two outlets such that one path goes through a filter. FIG. 4 shows, for example, a one inlet-two outlet water solenoid valve. A water filter 56 having an inlet 57 communicated with one 54 of the pair of outlets 54, 55 of the mixing valve 52, and having an outlet 58 communicated with the home appliance (1, W, O) hydraulic system 59. The water filter 56 can be a changeable water filter such as, for example, a filter with a changeable cartridge. A bypass line 60 having an inlet end 61 connected to the other 55 of the pair of outlets 54, 55 of the mixing valve 52, and having an outlet end 64 connected to the home appliance (1, W, O) hydraulic system 59. The mixing valve 52 is configured to at least one of direct water to the water filter 56 or direct water to the bypass line 60. The mixing valve 52 is controlled by a controller 66 that is configured to control the mixing valve 52 such that preheated water supplied to the home appliance (1, W, O) is one of unfiltered, mixed, or fully filtered by the water filter 56. The controller 66 can be a microcontroller or numerical control (NC) controller that operates by software to close the mixing valve 52, to operate the mixing valve 52 to direct hot water to the water filter 56, or direct hot water to the bypass line 60.

Ideally, it is desired to supply hot water to the home appliance (1, W, O) that is always fully filtered and thus has no contamination for cleaning dishes or clothes, or for steaming food. However, unlike with a refrigerator appliance where the water supplied to the water filter is cold water, for home appliances like the dishwasher 1, the washing machine W, and the steam cooking appliance O where hot water is used, the water filter is subjected to the hot water which drastically reduces the lifetime of a water filter. Accordingly, an aspect of the present disclosure is to limit or reduce the amount of hot water going through the water filter 56 by only using the water filter 56 when needed the most. For example, consistent with the present disclosure, the hot water can be directed by the mixing valve 52 to the water filter 56 only during certain cycles of the home appliance (1, W, O) such as, but not limited to, the rinse cycle, a pre-wash cycle, and/or a clean cycle.

Figure 5:
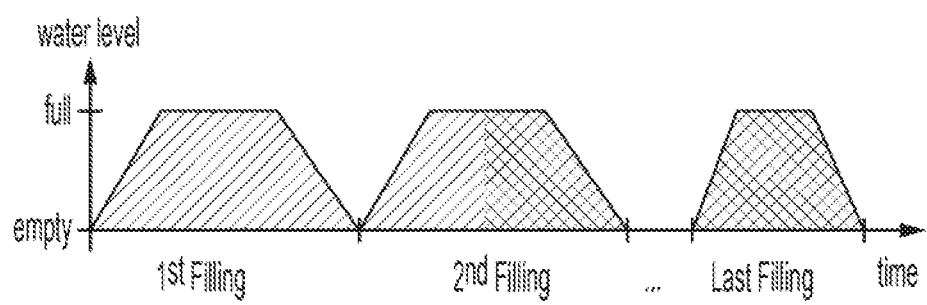
FIG. 5 shows a diagram of a filling and draining of a home appliance on a time scale as controlled by software according to an exemplary embodiment consistent with present disclosure.

FIG. 5 shows a diagram of a filling and draining of a home appliance such as a dishwasher 1 on a time scale as controlled by software according to an exemplary embodiment consistent with present disclosure. In particular, as shown in FIG. 5, during a first filling of the wash container 2 of the dishwasher 1, the wash container 2 is filled with unfiltered hot water in, for example, a pre-wash cycle, by controlling the mixing valve 52 to direct the heated water to the bypass line 60 so as to bypass the water filter 56. The soiled water is emptied from the wash container 2 by the dishwasher 1 and then the wash container 2 is filled during a second filling with both unfiltered water and filtered water for a mixture of both during, for example, a washing cycle. The mixture of both unfiltered and filtered hot water can be accomplished by controlling the mixing valve 52 with the controller 66 to first direct the hot water to the bypass line 60 for a preset time and to the wash container 2 and then after the preset time has elapsed, the controller 66 can control the mixing valve 52 to direct the hot water through the water filter 56 for the remainder of the second filling to fill the wash container 2. Finally, after the soiled water is emptied from the wash container 2 by the dishwasher 1, the wash container 2 is filled with fully filtered hot water during a last filling which can be, for example, a rinse cycle, by controlling the mixing valve 52 to direct the heated water to only the water filter 56. Thus, by limiting the full filtering of the hot water to the final or last filling during for example, a rinse cycle, the amount of hot water going through the water filter 56 can be controlled and reduced to avoid subjecting the water filter 56 to hot water every cycle. Moreover, though not limited to the last filling, the last filling most likely creates the most benefit from pure, filtered water from the standpoint of hygiene, as well as reduced contaminants in the water which lead to spots on dishes and other washware.

In the case of the water pretreatment system 50' for a washing machine W, the first filling could be an initial wash cycle where the washing machine W is filled with unfiltered hot water, and the second filling could be a main wash cycle where the washing machine W is filled with both unfiltered and filtered hot water, and the last filling could be a rinse cycle where the washing machine W is filled with only pure, filtered hot water so as to reduce contaminates in the water for the clothes.

In the case of the steam oven appliance O, since the volume of water is not as great as with a dishwasher 1 or a washing machine W, the water pretreatment system 50" can, for example, provide a mixture of both unfiltered and filtered hot water by controlling the mixing valve 52 with the controller 66 to first direct the hot water to the bypass line 60 for a preset time to fill the steam oven appliance O and then after the preset time has elapsed, the controller 66 can control the mixing valve 52 to direct the hot water through the water filter 56 for the remainder of the filling of the steam oven appliance O. Of course, unfiltered, mixed, and fully filtered hot water can also be provided to the steam oven appliance O just as with the dishwasher 1 and washing machine W.

Consistent with the present disclosure, it is contemplated that the water filter 56 filters out chlorine, lead, iron, harmful contaminants, and hardness, although not limited to these. Also, as noted above, the water filter 56 is a changeable filter which has changeable or replaceable filter cartridges that are typically replaced, for example, every month, every three months, or every year, or as the situation requires. A suitable changeable water filter having a removable filter cartridge is disclosed in U.S. Pat. No. 8,354,024 (Ihle et al.) which is incorporated herein by reference.

The present invention has substantial opportunity for variation without departing from the spirit or scope of the present invention. For example, while the water pretreatment system (50, 50', 50") is described above as being used with a home appliance such as the dishwasher 1, the washing machine W, or the steam oven appliance O, the present disclosure also contemplates the water pretreatment system (50, 50', 50") as being used with other home appliances that use hot water such as a coffee maker and the like. Moreover, while the water pretreatment system (50, 50', 50") is described above as being part of the individual home appliance such as the dishwasher 1, the washing machine W, or the steam oven appliance O, the present disclosure also contemplates a central home water pretreatment system which is strategically located with respect to the various home appliances, such as being located right after the hot water heater HWH in the hot water line P, for example, in the home owner's basement, and can thus filter or bypass the hot water to a number of home appliances that use hot water. The controller is thus configured to control the mixing valve such that preheated hot water supplied to any one of the three home appliances (1, W, O) is one of unfiltered, mixed, or fully filtered by the water filter. Such a central water pretreatment system could, for example, include a further directional valve that is also controlled by the controller to direct the water that has passed through the central home water pretreatment system to any one of the three home appliances (1, W, O).

Note that at times the system of the present disclosure is described as performing a certain function. However, one of ordinary skill in the art would know that the program is what is performing the function rather than the entity of the system itself.

Although aspects of one implementation of the present disclosure are depicted as being carried out by the controller 66 and includes software being stored in memory, one skilled in the art will appreciate that all or part of systems and methods consistent with the present invention may be stored on or read from other non-transitory computer-readable media, such as secondary storage devices, like hard disks, floppy disks, and CD-ROM, or other forms of a read-only memory (ROM) or a random access memory (RAM) either currently known or later developed. Further, although specific components of the system have been described, one skilled in the art will appreciate that a system suitable for use with the methods and systems consistent with the present disclosure may contain additional or different components.

Those skilled in the art will recognize improvements and modifications to the exemplary embodiments of the present invention. All such improvements and modifications are considered within the scope of the concepts disclosed herein and the claims that follow.

What is claimed is:

1. A water pretreatment system connected to a residential water supply pipe which supplies water that has been heated by a hot water heater to at least one residential appliance located within a residence, comprising:
　　a mixing valve having an inlet in fluid communication with the water supply pipe which receives heated water, and the mixing valve having a pair of outlets;
　　a water filter having an inlet in fluid communication with one of the pair of outlets of the mixing valve, and having an outlet in fluid communication with the at least one residential appliance selected from the group consisting of a dishwasher, a washing machine, or a steam oven, to supply heated, filtered water to the at least one residential appliance;
　　a bypass line having an inlet end in fluid communication with the other of the pair of outlets of the mixing valve, and having an outlet end in fluid communication with the at least one residential appliance, the bypass line which supplies heated, unfiltered water from the water supply line to the at least one residential appliance;
　　wherein the mixing valve is capable of directing heated water from the water supply pipe to the water filter and/or directing heated water to the bypass line; and
　　a controller configured to control the mixing valve such that the heated water supplied to the at least one residential appliance is one of unfiltered water, filtered water from the water filter, or mixed filtered water and unfiltered water obtained by the controller directing the mixing valve to send the unfiltered water from the water supply pipe to the bypass line for a preset time and after the preset time has elapsed, directing the mixing valve to send the unfiltered water from the water supply pipe to the water filter for a preset time;
　　wherein the controller controls the mixing valve to send only unfiltered water from the water supply pipe to the water filter only during predetermined operations of the at least one residential appliance.

2. The water pretreatment system of claim 1, wherein the controller comprises a microcontroller.

3. The water pretreatment system of claim 1, wherein water filter comprises one or more replaceable filter cartridges.

4. The water pretreatment system of claim 1, wherein the water from the water supply pipe is heated to approximately 110° F. to 140° F.

5. The water pretreatment system of claim 1, wherein the predetermined operations of the at least one residential appliance include a plurality of fillings of a wash container of the dishwasher or the washing machine;
　　wherein during a first filling, the wash container is filled with the heated water by the controller directing the mixing valve to direct the heated water from the water supply pipe to the bypass line so as to bypass the water filter,
　　wherein during a second filling, the mixed unfiltered water and filtered water fills the wash container by the controller directing the mixing valve to first send the heated water from the water supply line to the bypass line for the preset time and then after the preset time has elapsed, directing the mixing valve to send the heated water from the water supply line through the water filter for a remainder of the second filling, and wherein during a last filling, the wash container is filled with only heated, filtered water by the controller directing the mixing valve to send the heated water to only the water filter.

6. The water pretreatment system of claim 1, wherein the predetermined operations of the at least one residential appliance include a plurality of fillings of a wash container of the dishwasher which has a pre-wash cycle, a washing cycle, and a rinse cycle, wherein during a first filling, the wash container is filled with the heated water in the pre-wash cycle by the controller directing the mixing valve to direct the heated water from the water supply pipe to the bypass line so as to bypass the water filter, wherein during a second filling, the mixed unfiltered water and filtered water fills the wash container in the washing cycle by the controller directing the mixing valve to first send the heated water from the water supply line to the bypass line for a preset time, and then after the preset time has elapsed, the directing the mixing valve to send the heated water from the water supply line through the water filter for a remainder of the second filling, and during a last filling, the wash container is filled with only heated filtered water in the rinse cycle by the controller directing the mixing valve to send the heated water to only the water filter.

7. The water pretreatment system of claim 1, wherein the heated water is directed by the mixing valve to the water filter only during certain predetermined operations including cycles of the at least one residential appliance, and the heated water is directed by the mixing valve to the bypass line so as to bypass the water filter at other times.

* * * * *